(12) United States Patent
Bozzano et al.

(10) Patent No.: US 11,480,094 B2
(45) Date of Patent: Oct. 25, 2022

(54) MOTOR COOLING SYSTEM (71) Applicant: MONZA TECH S.R.L., Monza (IT)

(72) Inventors: Francesco Bozzano, Vedano del Lambro (IT); Alessandro Sirtori, Vedano del Lambro (IT)

(*) Notice: Subject to any disclaimer, the term of this patent is extended or adjusted under 35 U.S.C. 154(b) by 862 days.

(21) Appl. No.: 16/316,863

(22) PCT Filed: Jul. 10, 2017

(86) PCT No.: PCT/EP2017/068941
§ 371 (c)(1),
(2) Date: Jan. 10, 2019

(87) PCT Pub. No.: WO2018/019914
PCT Pub. Date: Feb. 1, 2018

(65) Prior Publication Data
US 2020/0072118 A1 Mar. 5, 2020

(30) Foreign Application Priority Data

Jul. 27, 2016 (IT) .......... 102016000079060

(51) Int. Cl.
*F01P 7/16* (2006.01)
*F01P 7/12* (2006.01)
*F01P 5/10* (2006.01)
*F01P 5/02* (2006.01)
(Continued)

(52) U.S. Cl.
CPC .......... *F01P 7/164* (2013.01); *B60H 1/00885* (2013.01); *F01P 5/02* (2013.01); *F01P 5/10* (2013.01); *F01P 7/12* (2013.01); *F01P 2005/046* (2013.01)

(58) Field of Classification Search
CPC ........ F01P 7/164; F01P 5/10; F01P 2005/046; F01P 7/16; F01P 5/00; F01P 5/02; F01P 7/10; F01P 7/12; F01P 2005/125; F01P 2025/30; F01P 2025/32; F01P 2025/34; B60H 1/00885
See application file for complete search history.

(56) References Cited

U.S. PATENT DOCUMENTS

| 4,580,531 A | 4/1986 | N Guyen |
| 6,425,353 B1 | 7/2002 | Davies |

(Continued)

FOREIGN PATENT DOCUMENTS

EP 0557113 A2 8/1993

OTHER PUBLICATIONS

International Search Report for PCT/EP2017/068941.
International Preliminary Report on Patentability for PCT/EP2017/068941.

*Primary Examiner* — Jacob M Amick
(74) *Attorney, Agent, or Firm* — Egbert, McDaniel & Swartz, PLLC (57) ABSTRACT

A cooling system includes a motor block, a radiator provided with a fan, a pump with an electrical motor to pump the coolant in a cooling circuit, a first temperature sensor at the outlet of the motor block, a second temperature sensor at the outlet of the radiator, a control unit-connected to the temperature sensors and to the electrical motor of the pump to actuate the electrical motor of the pump according to the temperature values detected by the sensor temperatures.

8 Claims, 7 Drawing Sheets

(51) Int. Cl.
*B60H 1/00* (2006.01)
*F01P 5/04* (2006.01)

(56) References Cited

U.S. PATENT DOCUMENTS

| | | | |
|---|---|---|---|
| 2011/0265742 A1* | 11/2011 | Choi | F01P 7/161 123/41.09 |
| 2015/0027152 A1* | 1/2015 | Marco | B60H 1/321 62/126 |
| 2016/0115858 A1 | 4/2016 | Selinger et al. | |

* cited by examiner

MOTOR COOLING SYSTEM

The present patent application for industrial invention relates to a motor cooling system.

Although specific reference is made to an endothermic motor (internal combustion motor) in the following description, the present invention also relates any other type of motor, such as an electrical or a hybrid motor.

As it is known, most endothermic motors are water cooled.

The prior art of a cooling circuit of an endothermic motor consists in a water pump that is mechanically actuated by the endothermic motor. The number of revolutions of the pump is proportional to the number of revolutions m of the motor, given the fact that the transmission ratio between pump and motor is fixed and is determined by the gears or pulleys that move the pump.

Figure 1:
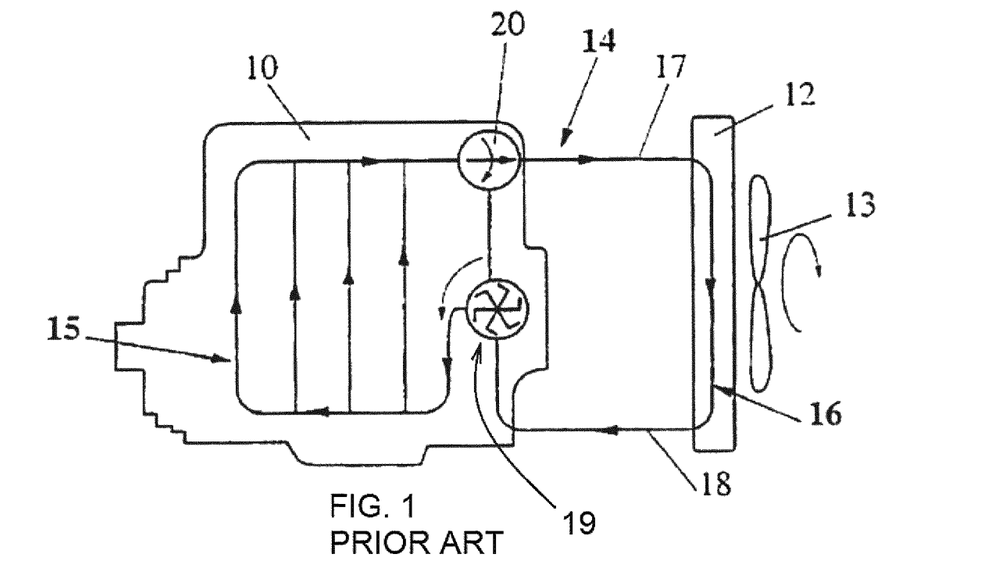
FIG. 1 is a block diagram of a cooling system according to the prior art.

FIG. 1 shows a traditional cooling system provided with a cooling circuit comprising a long circuit (15, 16, 17, 18) passing through a motor block and a short circuit (15) passing through a radiator (12).

A pump (19) moves the coolant that is suitably conveyed into the different circuits (15, 17, 16, 18) by means of a thermostatic valve (20) controlled by a temperature sensor.

When the motor (10) is cold, the thermostatic valve (20) closes the long circuit, bypassing the short circuit. When the temperature of the coolant reaches a preset value, the thermostatic valve (20) opens the long circuit and lets the coolant flow also in the long circuit through the radiator (12).

If the temperature of the coolant exceeds the operating temperature of the motor, a fan (13) that is installed in series to the radiator (12) is activated by means of a relay. The activation of the fan (13) increases the quantity of air that hits the coolant, generating a further caloric dissipation.

In such a configuration, the speed of the coolant flow and the speed of the fan (13) are not controlled because the pump (19) changes its number of revolutions (rpm) according to the rpm of the motor and the fan (13) is subject to a simple Boolean OFF and ON variable. In other words, the fan is either off or on at the maximum number of revolutions determined by the battery voltage.

Such a cooling system causes an oscillatory trend of the temperature of the system, being unable to control this variable in the best way. The mass flow of the liquid in the refrigeration circuit is not controlled by the real cooling requirement of the motor, but by its number of revolutions, with the risk of cavitation on the pump and with an undesired power absorption that impairs the efficiency of the endothermic motor and causes higher consumption. The efficiency of such cooling system is low.

Figure 2:
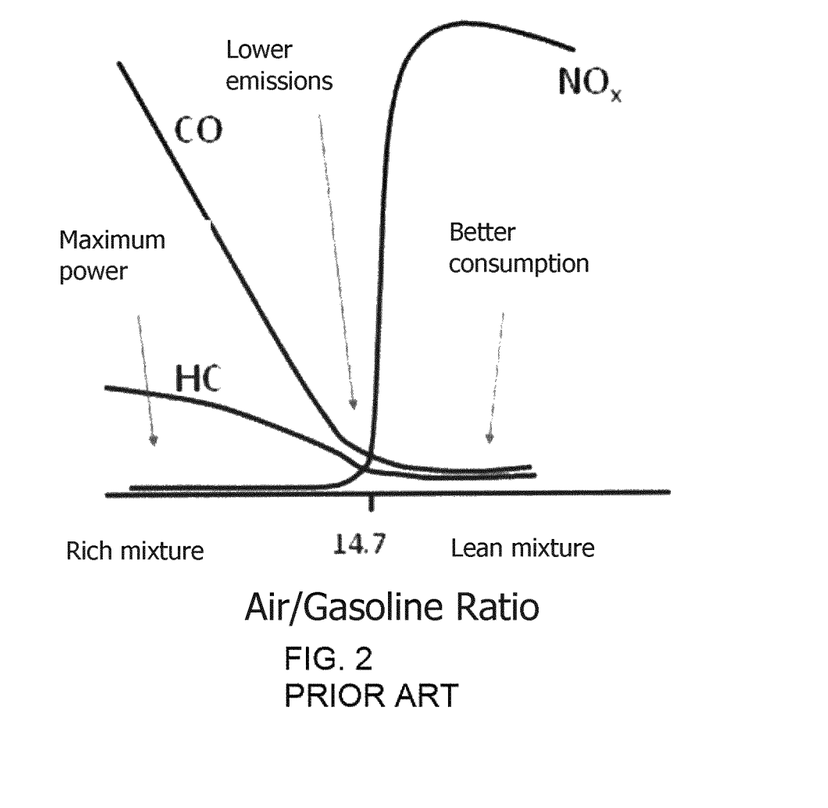
FIG. 2 is a chart showing the emissions of an endothermic motor with a cooling system according to the prior art.
Figure 3:
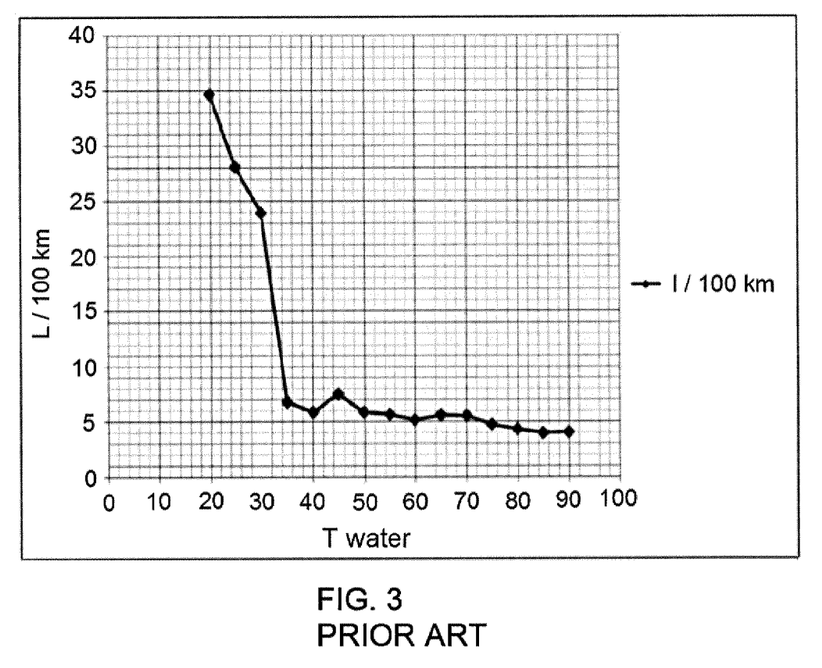
FIG. 3 is a Cartesian coordinate system showing the water temperature on the abscissa axis and the number of moles of the pollutants on the ordinate axis, for a cooling system according to the prior art.

In summary, the drawbacks of said cooling system according to the prior art are:
motor cooling is not optimized;
the pump rpm is proportional to the motor rpm;
a long time is needed to warm up the system because of the thermostatic valve (20);
the warmup time of the motor is long. The ECU (motor control unit) is forced to lubricate the mixture of the motor with a consequent increase of the HC and CO emitted in the atmosphere and of the consumption (see FIGS. 2 and 3, which are charts referring to the Yaris hybrid vehicle with data obtained via CAN from the ECU);
the speed of the coolant flow is not appropriately controlled;
fuel consumption is higher because the pump of the cooling system is always engaged on the motor;
the fan of the radiator is managed as Boolean variable: ON at maximum rpm or OFF (high power absorption of this component, proximal to 30 A). The full power of the fan is very seldom necessary, it being only partially needed;
no correlation exists between the thermal load of the motor and the thermal exchange of the radiator (the air that hits the radiator is not sufficient in first gear at 6000 revolutions at 30 km/h);
a motor needs 8-10 km to reach the operating temperature with all its coolant. Traveling distances of a vehicle in a city are normally lower than 8 Km, therefore motors are often traveling in constant enrichment status of the mixture strength;
during the warm up, the mechanical parts of the motor are exposed to accelerated wear, with a consequent reduction of the motor life and an increase of consumption and emissions, when the motor loses the mechanical tolerances and the pre-loads of the seals (leakage);
the cooling down when the motor is off is not managed, consequently accumulating heat in the motor. The water circulates in the circuit only because of its density gradient due to the non-homogeneous temperature, when the vehicle is turned off.

Figure 4:
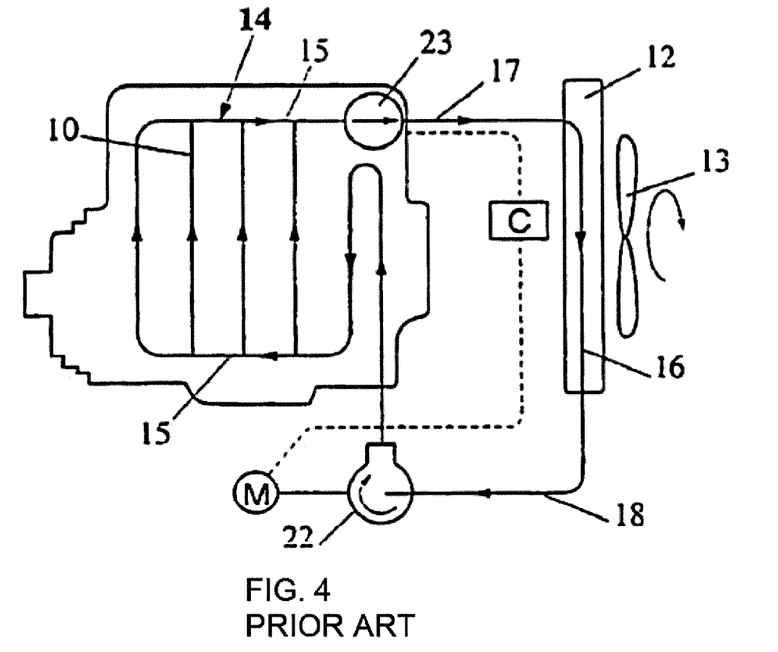
FIG. 4 is a block diagram of a cooling system disclosed in US6425353.

These drawbacks are solved, at least partially, in US6425353. With reference to FIG. 4, US6425353 discloses the use of an electrical motor (M) that actuates a pump (22) of the cooling system independently from the endothermic motor. The pump (22) is mounted at the outlet of the radiator (12). Erroneously, such a cooling system does not provide for a thermostatic valve. A control unit (C) controls the electrical motor (M) of the pump. A single temperature sensor (23) detects the temperature at the outlet of the long circuit (15). The control unit (C) receives the temperature values detected by the temperature sensor (23), compares them with a target temperature that is to be reached and maintained and varies the power voltage of the electrical motor (M) in such a way to vary the rpm of the pump (22). In this way, the quantity of water flow that hits the hot parts of the motor can be varied regardless of the number of revolutions of the endothermic motor.

The electrical motor (M) is pulse-activated for an "ON" period and then deactivated for an "OFF" period, alternating the ON period with the OFF period and changing the proportion between ON and OFF according to the temperature sensor. Otherwise said, the "ON" voltage percentage increases with respect to the "OFF" voltage percentage according to the temperature detected by the temperature sensor (23). The control unit (C) is configured in such a way to send different voltage levels to the electrical motor (M) according to the different temperature levels detected by the temperature sensor (23). Below a preset temperature value, the pump (22) is powered with a fixed voltage in a low range, which is gradually increased when the temperature detected by the temperature sensor (23) increases. Also the period of the power supply pulses of the electrical motor is varied.

The cooling system of U.S. Pat. No. 6,425,353 is impaired by drawbacks caused by the difficulties encountered when powering the electrical motor of the pump with pulses at different voltage levels. In fact, the electrical motor (M) should be controlled in pulse width modulation (PWM) and not in variable voltage. However, the PWM provides for modulating only the width (duration) and not the intensity (voltage level) of the impulse.

Moreover, by using only one temperature sensor (23), before the pump (22) operates at full speed, all the water contained in the cooling circuit (14, 17, 18) must be heated, and this takes a long time. Finally, if the amount of heat dissipated by the radiator is higher than the amount of heat produced by the endothermic motor, the motor will never reach its correct operating temperature.

US2011265742 discloses a method and a control device of a water pump of a hybrid vehicle, which are used to control the water pump according to the heat emission of the motor.

The purpose of the present invention is to eliminate the drawbacks of the prior art, by disclosing a cooling system of a motor that is capable of minimizing the heating time of the motor, consequently minimizing the consumption and the pollution caused by the mixture enrichment during the first kilometers after starting the motor.

Another purpose of the present invention is to provide such a cooling system of a motor that is efficient, reliable and high-performing.

Another purpose of the present invention is to provide such a cooling system of a motor that is versatile, simple to make and install.

Another purpose of the present invention is to provide such a cooling system that is capable of making the radiator and the motor completely independent, with the priority purpose of achieving the operating temperature of the motor rapidly.

These purposes are achieved according to the present invention with the characteristics of the independent claim 1.

Advantageous embodiments of the invention appear from the dependent claims.

The cooling system of the invention comprises:
a motor block,
a radiator provided with fan,
a cooling circuit in which a coolant flows, said cooling circuit comprising a first conduit that goes from the motor block to the radiator, and a second conduit that goes from the radiator to the motor block,
a pump disposed in the second conduit to pump the coolant in the cooling circuit towards the motor block,
an electrical motor that actuates the pump,
a first temperature sensor disposed in the first conduit at the outlet of the motor block to detect a temperature of the coolant at the outlet of the motor block,
a second temperature sensor disposed in the second conduit at the outlet of the radiator to detect a temperature of the coolant at the outlet of the radiator,
a control unit connected to the first temperature sensor and to the electrical motor of the pump in order to actuate the electrical motor of the pump according to the temperature values detected by the first temperature sensor and by the second temperature sensor,
a second temperature sensor disposed in the second conduit at the outlet of the radiator in order to detect a temperature of the coolant at the outlet of the radiator.

The control unit is provided with a memory to store reference temperature difference values that decrease gradually, in such a way to define a plurality of intervals of decreasing temperature differences. The control unit is configured in such manner to compare the temperature difference detected by the temperature sensors with the intervals of temperature differences stored in the memory and accordingly control said motor of the pump with different modes.

Additional features of the invention will appear clearer from the detailed description below, which refers to a merely illustrative, not limiting embodiment, wherein.

Figure 5:
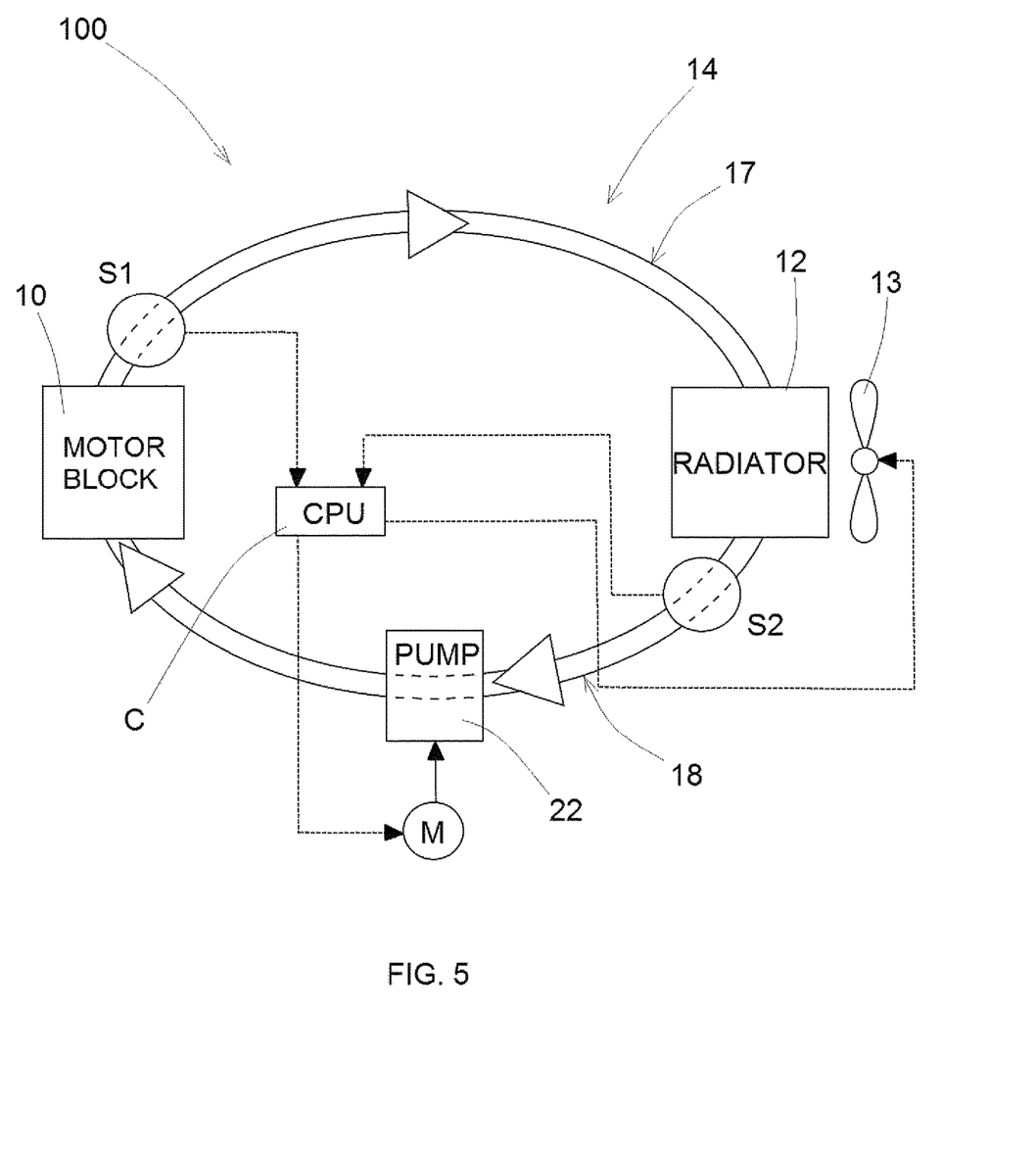
FIG. 5 is a block diagram of the cooling system according to the invention.

With reference to FIG. 5, the cooling system of the invention is disclosed, which is generally indicated with reference numeral (100).

The cooling system (100) comprises a cooling circuit (14) that passes through a block motor (10) and a radiator (12) cooled by a fan (13). A coolant flows in the cooling circuit (14). The motor block (10) can be the block of any motor of a vehicle, such as for example an endothermic motor, an electrical motor or a hybrid motor.

The cooling circuit comprises a first conduit (17) that goes from the motor block (10) to the radiator (12) and a second conduit (18) that goes from the radiator (12) to the motor block (10).

A pump (22) is disposed in the second conduit (18) to pump the coolant in the cooling circuit (14). The pump (22) is an electrical pump actuated by an electrical motor (M).

A first temperature sensor (S1) is disposed in the first conduit (17) at the outlet of the motor block (10) to detect a temperature (T1) of the coolant at the outlet of the motor block. A second temperature sensor (S2) is disposed in the second conduit (18) at the outlet of the radiator (12) to detect a temperature (T2) of the coolant at the outlet of the radiator.

The temperature sensors (S1, S2) are connected to a control unit (C). The control unit (C) is connected to the electrical motor (M) to actuate the electrical motor according to the temperature values detected by the temperature sensors (S1, S2). In particular, the electrical motor (M) is actuated by means of pulse width modulation (PWM), modulating the pulse width (duration) according to the temperature difference values (T1−T2) detected by the two temperature sensors (S1, S2).

The present invention is based on a calorimetric calculation that separates the two machines, i.e. the endothermic motor and the radiator, making an energy balance of the heat produced by the motor and the heat dissipated by the radiator. In this way, the two machines can be separated as it they were independent. With such an energy balance, it is possible to have a limit condition with the completely frozen radiator and the motor of the vehicle running at regular operating temperature, without a thermostatic valve.

The energy balance scheme is as follows:

$$Qe = m \times Cp \times \Delta T1$$

$$Qr = m \times Cp \times \Delta T2$$

$$Qe = Qr$$

Such an energy balance is assessed in the time unit.
where Qe=heat produced by the motor of the vehicle
Qr=heat dissipated by the radiator
m=mass flow of the coolant, knowing the pwm command of the pump that manages the RPMs and consequently the flow rate of the pump in the time unit (it becomes a mass in this way).
Cp=specific heat at constant pressure of the coolant
$\Delta T1$=temperature time variation of the coolant coming out of the motor block (10) in the time unit
$\Delta T2$=temperature time variation of the coolant coming out of the radiator (12) in the time unit The condition Qe=Qr is imposed for the thermodynamic balance of the system, to avoid overheating, because the radiator (12) is underdimensioned with respect to the motor block (10).

Such a thermal balance is obtained by simply measuring the temperature of the flow between motor and radiator with the first temperature sensor (S1) and the temperature of the flow between radiator and motor with the second temperature sensor (S2).

Moreover, the control unit (C) is connected to the electrical motor of the fan (13) of the radiator in order to control the electrical motor of the fan (13) of the radiator in PWM. The PWM command of the motor of the fan is separated and independent from the PWM of the motor (M) of the pump.

The temperature sensors (S1, S2) detect the temperatures (T1, T2).

A target temperature (Ttarget) that is set by the user (motor manufacturer or user) is stored in the control unit (C) for a correct operation of the internal combustion motor. For example, a target temperature Ttarget=51° C. can be set. The algorithm must be such that the temperature of the internal combustion motor reaches the target temperature (Ttarget) as promptly as possible.

Other two reference temperature values are automatically calculated from said target temperature (Ttarget): the warm-up temperature (Twarm-up) and the threshold temperature (Tthreshold), which are calculated as percentage values of the target temperature (Ttarget). For illustrative purpose:

Twarm-up=85% Ttarget
Tthreshold=92% Ttarget.

Moreover, a maximum permitted temperature is calculated:

Tmax=Ttarget+n, with n>0 for instance n=10° C.

Four different temperature intervals are defined between the temperature (T1) at the outlet of the motor and the temperature (T2) at the outlet of the radiator:

$$T1-T2 > Ta$$

$$Tb < T1-T2 < Ta$$

$$Tc < T1-T2 < Tb$$

$$T1-T2 < Tc$$

For illustration purposes, Ta=30° C.; Tb=20° C. and Tc=5° C.

Such temperature intervals go from a first temperature interval T1−T2>Ta in which the temperature difference is high, to a fourth temperature interval T1−T2<Tc, in which the temperature difference is low and the balance temperature is about to be reached with T1=T2.

Therefore four reference temperature values (Ttarget, Twarm-up, Tthreshold, Tmax) and three temperature values (Ta, Tb, Tc), which define four reference temperature intervals, are stored in the control unit (C).

In such a case, the motor (M) of the pump can be controlled in PWM with different control modes, according to the temperature values T1 and T2 detected by the sensors S1 and S2. In the following description, PWMmax indicates the maximum PWM permitted by the electronics of the motor (M) of the pump.

Example (1) (T1−T2>Ta; in which Ta=30° C.)

In such a case, the electrical motor (M) of the pump is controlled in PWM, with a square wave pulse train having a PWM value lower than PWMmax, for example 60% PWMmax.

The PWM has an ON time in which the value is 60% PWMmax, and an OFF time in which the value is zero. So the PWM period is the sum of the ON and OFF time. The duty cycle of the PWM is the ON time divided by the PWM period.

The ON time of the PWM is maintained fixed, whereas the OFF time of the PWM is modified according to the temperature (T1) detected at the outlet of the endothermic motor. Only the temperature Ttarget and the temperature Tmax=Ttarget+10 are considered.

Figure 6:
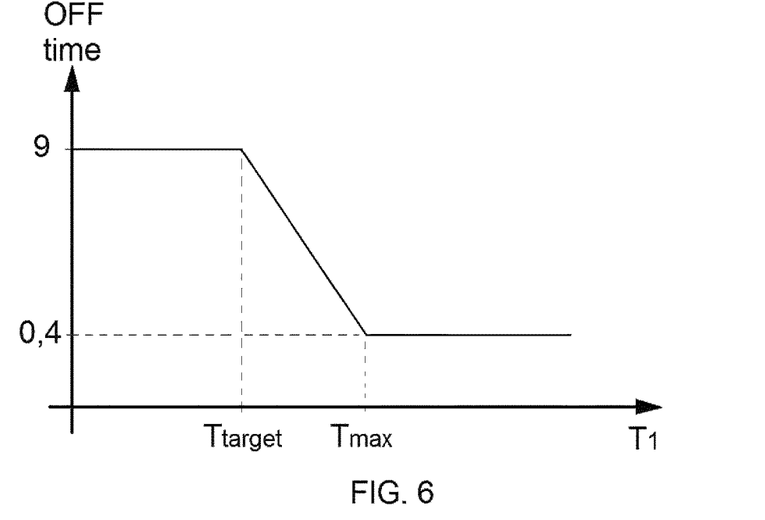
FIG. 6 is a chart showing an OFF time variation of the PWM according to the temperature.

With reference to FIG. 6, in this case there are three different control modes of the motor of the pump:

for T1<Ttarget the OFF period of the PWM is maintained constant;

for T1<Ttarget<Tmax the OFF period of the PWM decreases linearly when the temperature T1 increases;

for T1>Tmax the OFF period of the PWM is maintained constant at a limit value.

Mode (1A) (T1<Ttarget)

Figure 7:
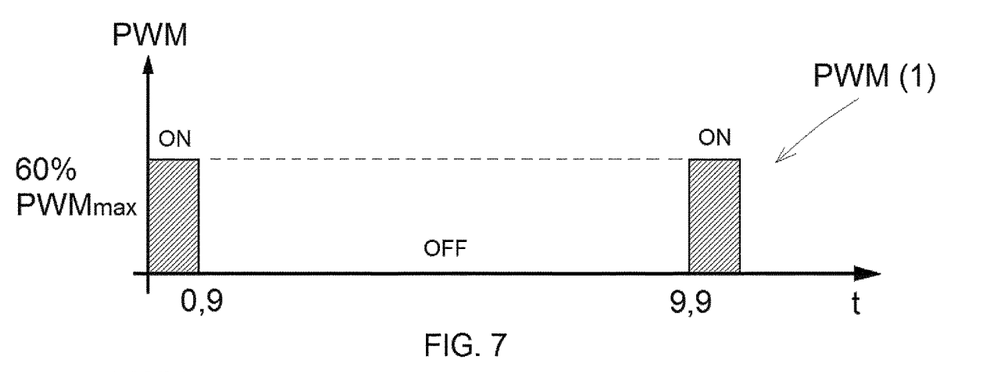
FIG. 7 is chart showing a PWM with constant period and maximum OFF time.

In this case the water at the inlet of the motor block (10) has a high caloric capacity of subtracting heat (Q) from the motor. Therefore, with reference to FIG. 7, the electrical motor (M) of the pump is controlled with a square wave pulse train PWM(1) with a constant period and a very low duty cycle, for example a duty cycle (d) lower than 0.1. For instance, PWM(1) has an ON time that is ⅒ of the OFF time, for instance the ON time is 0.9 s and the OFF time is 10 s, in such a way to obtain a duty cycle (d=0.9/9.9=0.09). PWM(1) is maintained until T1 reaches Ttarget.

Mode (1B) (Ttarget≤T1≤Tmax)

When T1 has reached the temperature Ttarget, the duty cycle of the PWM is increased linearly, i.e. the OFF time of the PWM decreases linearly when the temperature T1 increases, until T1=Tmax is reached. With reference to FIG. 6, the OFF time of the PWM decreases linearly from 9 s to 0.4 s until it reaches a limit value PWM(limit), in which the OFF time is lower than the ON time, i.e. for PWM(limit) the ON time is always 0.9 s, whereas the OFF time is 0.4 s, in such a way to obtain a duty cycle (d=0.9/1.3=0.69), i.e. the duty cycle of the PWM is increased linearly up to the limit value.

Mode (1C) (T1>Tmax)

Figure 8:
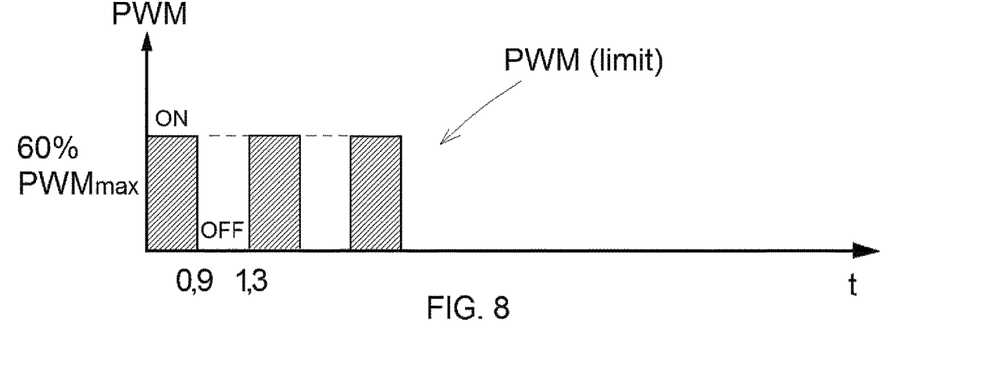
FIG. 8 is the same chart as FIG. 7, except for a PWM with constant period and minimum OFF time.

With reference to FIG. 8, in this mode the motor of the pump is always controlled with the limit value PWM(limit), in which the OFF time is lower than the ON time.

Case (2) (Tb<T1−T2≤Ta; in which Ta=30° C. e Tb=20° C.)

Case (2) is similar to case (1), in which the PWM value is 60% PWMmax; however, because the temperature difference T1−T2 is lower than in case 1, in case 2 for T1<Ttarget the motor of the pump is controlled with a PWM having an OFF time lower than the case 1, for example an OFF time of 4 s.

Figure 9:
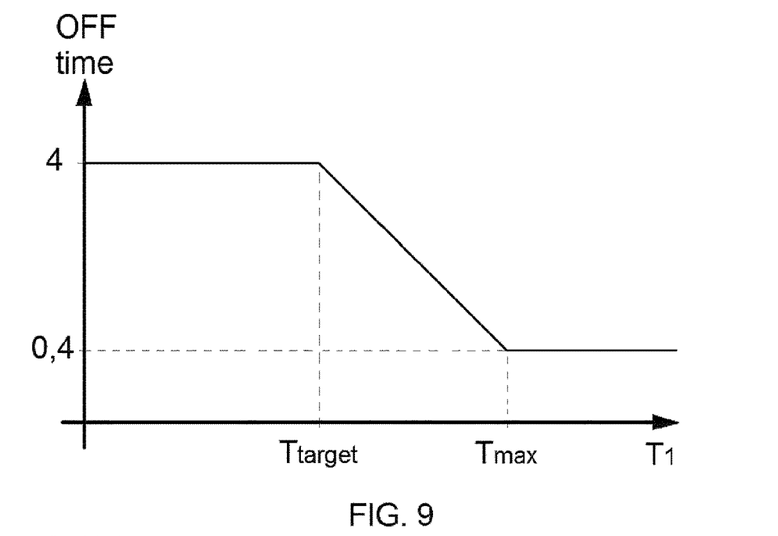
FIG. 9 is the same chart as FIG. 6, wherein the OFF time is set for a different interval of temperature differences.

With reference to FIG. 9, in this case there are three different control modes of the motor of the pump:

for T1<Ttarget the OFF period of the PWM is maintained constant;

for T1≤Ttarget≤Tmax the OFF period of the PWM decreases linearly when the temperature T1 increases;

for T1>Tmax the OFF period of the PWM is maintained constant at a limit value.

Mode (2A) (T1<Ttarget)

Figure 10:
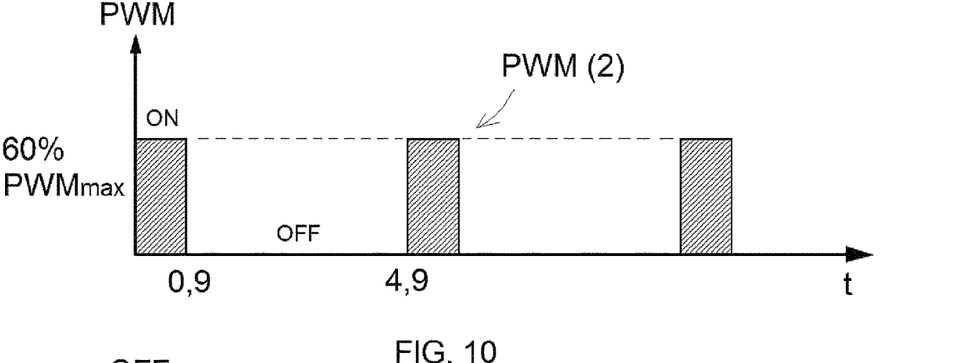
FIG. 10 is the same chart as FIG. 7, wherein the OFF time is set for a different interval of temperature differences.

With reference to FIG. 10, the electric motor (M) of the pump is controlled with a square wave pulse train PWM(2) with a constant period and a duty cycle higher than in case 1, for example a duty cycle (d) higher than 0.1. For example, PWM(2) has an ON time lower than ¼ of the OFF time, for example the ON time is 0.9 s and the OFF time is 4 s, in such a way to obtain a duty cycle (d=0.9/4.9=0.183). PWM(2) is maintained until T1 reaches Ttarget.

Mode (2B) (Ttarget≤T1≤Tmax)

When T1 has reached the temperature Ttarget, the duty cycle of the PWM is increased linearly, i.e. the OFF time of the PWM decreases linearly when the temperature T1 increases, until T1=Tmax is reached. With reference to FIG. 9, the OFF time of the PWM decreases linearly from 4 s to 0.4 s until the limit value PWM(limit) is reached, in which the OFF time is lower than the ONE time; i.e. for PWM (limit) the ON time is always 0.9 s, whereas the OFF time is 0.4 s, in such a way to obtain a duty cycle (d=0.9/1.3=0.69), i.e. the duty cycle of the PWM is increased linearly up to the limit value.

Mode (2C) (T1>Tmax)),

With reference to FIG. 8, in this mode the motor of the pump is always controlled with the limit value PWM(limit), in which the OFF time is lower than the ON time.

The mode (2C) is identical to the mode (1C), in this case the motor of the pump is always controlled with the limit value PWM(limit), in which the OFF time is lower than the ON time. Therefore for T1−T2≥Tb and T1>Tmax the motor of the pump is always controlled with the limit value PWM(limit).

Case 3 (Tc≤T1−T2≤Tb; in which Tb=20° C. and Tc=5° C.)

In this case, given that the temperature difference T1−T2 has reached a limited value, the temperature T1 is compared with Twarmup to distinguish two different control modes of the motor of the pump:

for T1≤Twarmup the OFF time of the PWM decreases linearly when the temperature T1 increases;

for T1>Twarmup the duty cycle of the PWM is calculated according to a PID (Proportional Integrative Derivative) algorithm.

Mode 3A (T1≤Twarmup)

In this case the PWM that controls the motor of the fan has a value equal to 60% PWMmax.

Figure 11:
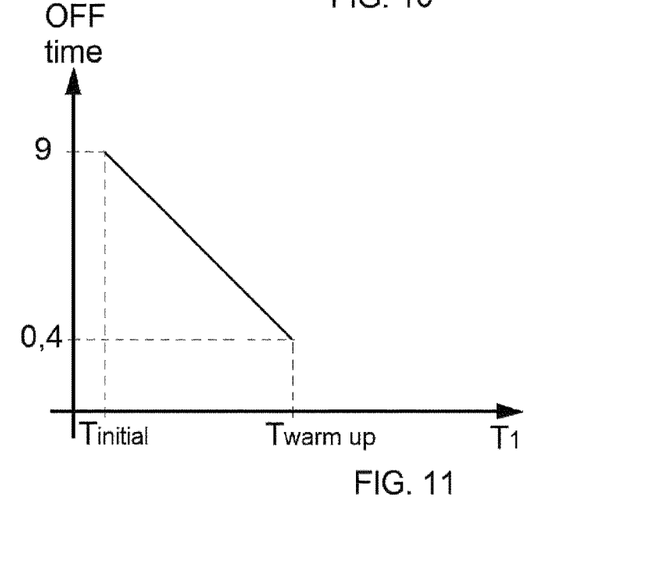
FIG. 11 is a chart showing an OFF time variation of the PWM according to the temperature.

With reference to FIG. 11, starting from a cold endothermic motor, when the motor is started, the sensor (S1) detects an initial temperature (Tinitial). Starting from the initial temperature (Tinitial), the OFF time of the PWM is much higher than the ON time; for example, at the initial temperature the OFF time is 9 s and the ON time is 0.9 s. The OFF time of the PWM decreases linearly when the temperature T1 increases, until T1 reaches Twarmup. Otherwise said, the OFF time of the PWM decreases linearly from 9 s to 0.4 s when T1=Twarmup.

Figure 12:
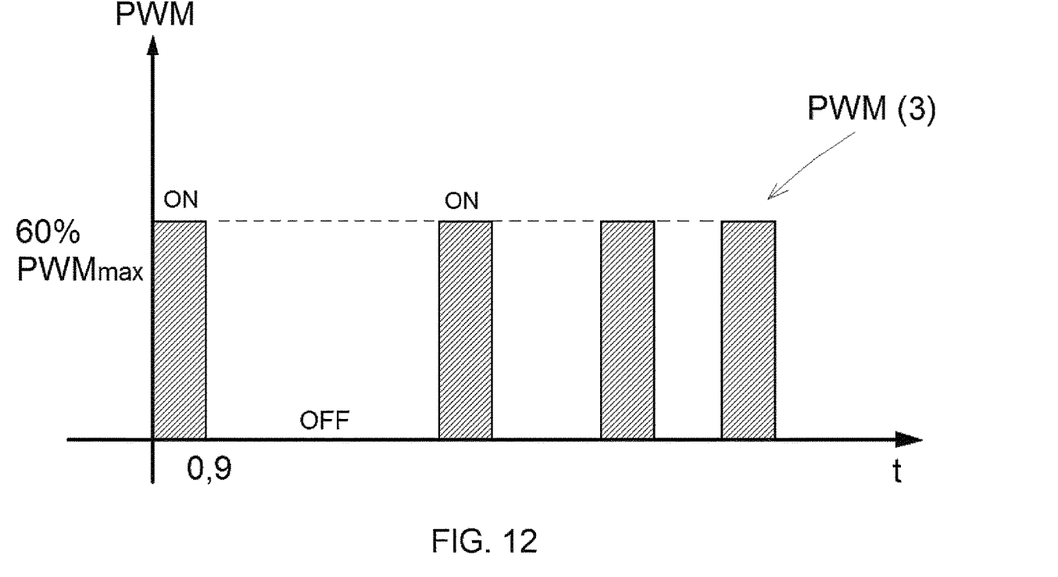
FIG. 12 is a chart showing a PWM with OFF time that decreases linearly when the temperature increases.

With reference to FIG. 12, in this case the motor of the pump is controlled with a pulse train PWM(3) with value equal to 60% PWMmax and the OFF time decreases linearly when the temperature T1 increases.

Mode 3B (T1>Twarmup)

When T1 exceeds Twarmup, the motor of the pump is controlled by a PWM in which the duty cycle of the PWM is increased according to the temperature T1, not in a linear mode, but according to a P.I.D. (Proportional, Integrative, Derivative) algorithm of known type, and therefore not described herein in further detail. Such a PID algorithm provides for the experimental calculation of three constants: a proportional constant Kp, an integrative constant Ki and a derivative constant Kd.

Figure 13:
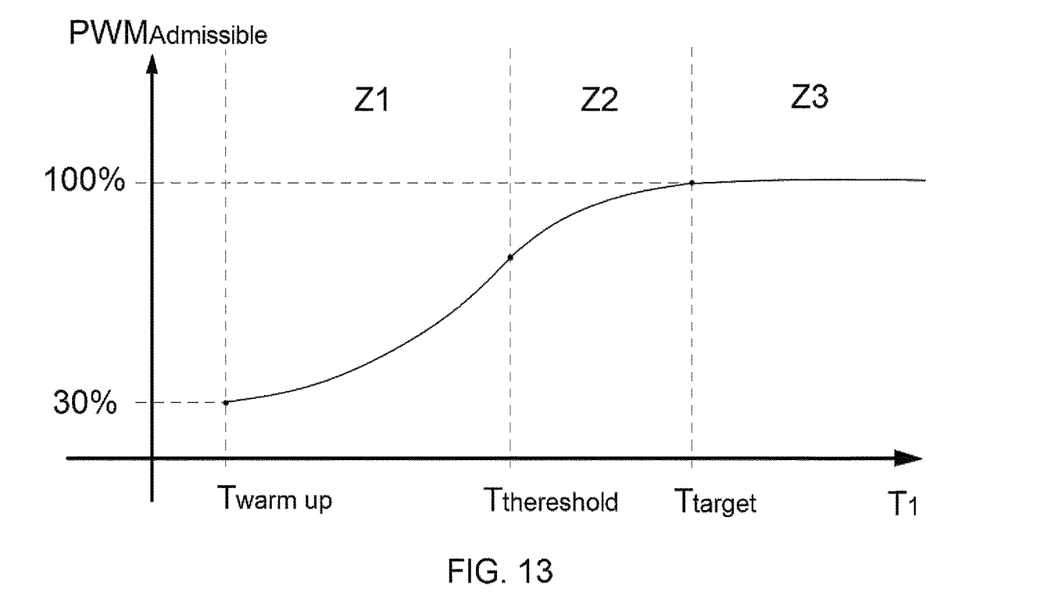
FIG. 13 is a chart showing admissible PWM values when the temperature T1 changes, which are calculated with a PID algorithm.

With reference to FIG. 13, the PWM calculated by the algorithm PID has an admissible value (PWMadmissible) that varies from 30% to 100%.

Figure 14:
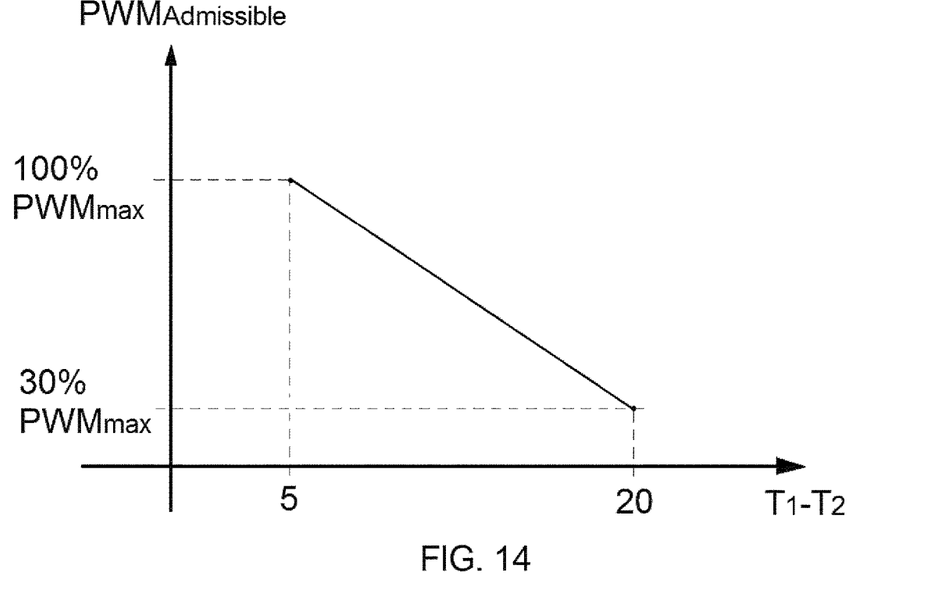
FIG. 14 is a chart showing how to calculate the admissible PWM when the temperature difference T1−T2 changes.

With reference to FIG. 14, the PWMadmissible is calculated according to the variation of the temperature difference T1−T2 in the interval from 5° C. to 20° C. Otherwise said, the PWMadmissible decreases linearly from a value of 100% PWMmax to a value 30% PWMmax when the temperature difference increases from 5° C. to 20° C.

Going back to FIG. 13, the calculation of the duty cycle of the PWM made by the PID algorithm is differentiated in three zones (Z1, Z2, Z3) according to the temperature T1. Therefore, in such a case, three different control submodes of the motor of the pump can be identified:

Twarmup<T1<Tthreshold

Tthreshold≤T1≤Ttarget

T1>Ttarget

Mode (3B1) (Twarmup<T1<Tthreshold)

In this temperature interval, the proportional constant (KP) of the PID algorithm dominates; in fact, experimentally Kp=15; Ki=10 and Kd=1. This is true until T1 is proximal to Tthreshold.

Mode (3B2) (Tthreshold≤T1≤Ttarget)

In this temperature interval, the integrative constant Ki of the PID algorithm dominates; in fact, in this case Kp=8.5; Ki=15 and Kd=2.

Mode 3B3 (T1>Ttarget)

In this case, the PID algorithm is set in such a way that the motor of the pump is always powered with 100% PWMadmissible that is calculated according to the temperature difference T1−T2, as shown in FIG. 14.

Case 4 (T1−T2<Tc; in which Tc=5° C.)

Figure 15:
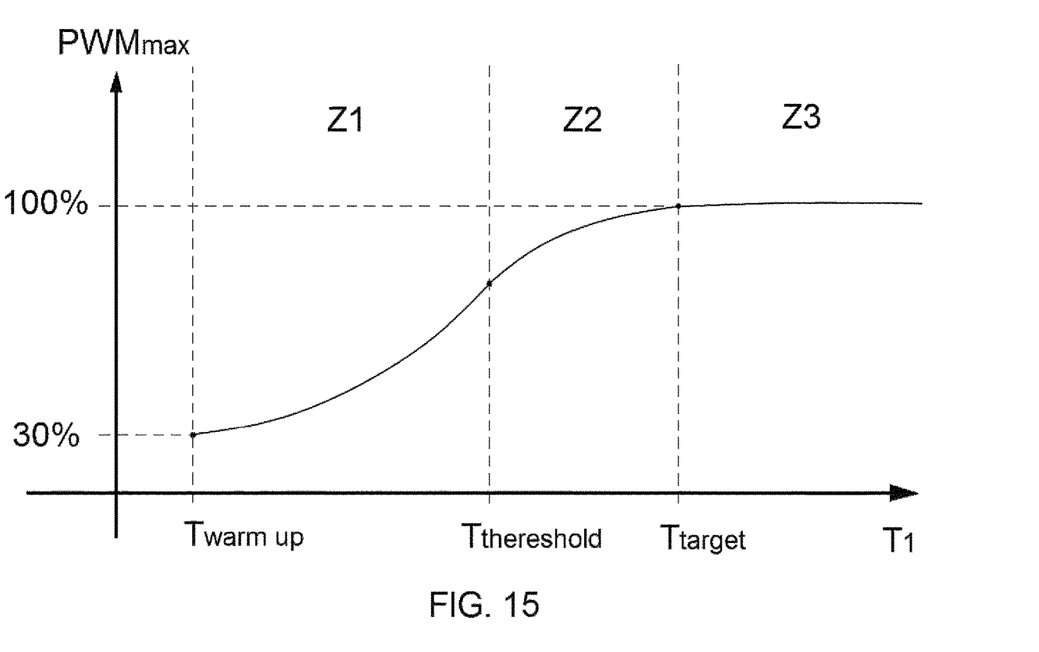
FIG. 15 is a chart showing the PWMmax values when the temperature T1 changes, which are calculated with a PID algorithm.

Case 4 is similar to case 3, the only difference being that the PWM value calculated by the PID algorithm is not an admissible value, like the one calculated with reference to FIG. 14, but varies from 30% PWMmax to 100% PWMmax, as shown in FIG. 15.

Therefore for T≤Twarmup the motor of the pump is controlled with PWM(3) as illustrated in FIG. 12.

Instead, for T>Twarmup the motor of the pump is controlled with a PWM in which the duty cycle increases when the temperature increases, as shown in FIG. 15.

The various operating modes of the motor (M) of the pump are managed because the pump (22) operates as pump and as thermostat. If the temperature of the coolant is much lower than the temperature of the motor block (10), the coolant will subtract more heat from the motor bloc compared to the same flow with a lower Δtemperature=T1−T2. This is an energy balance on the capability of the coolant to absorb/yield heat in the radiation (12) and in the motor block (10). The calculation is made starting from the temperature sensors (S1, S2), knowing the flow rate of the control unit that controls the number of revolutions (RPM) of the pump.

If the radiator (12) is hit (for example in winter) by a cooling air flow that subtracts a higher amount of heat compared to the amount that the motor block (10) can produce, the motor block (10) will only receive the quantity of flow that is necessary to maintain the correct operating temperature that corresponds to the target temperature (Ttarget) and no extra flow will be sent, given that the quantity of heat dissipated by the radiator is calculated by means of the sensor (S2).

For actuating the electrical motor of the fan (13) only the temperature (T1) at the outlet of the motor block (10) is detected. In this case there is only one control mode of the electrical motor of the fan.

Case 1 (T1≥Ttarget+Z)

Z=Δtemperature defined for switching on the fan of the radiator. The law of correspondence between the PWM modulation of the motor of the fan and Z is an increment of 10% of the PWM at every increase of one degree compared to Ttarget until 100% is reached. Therefore, for example, T1=54 and Ttarget=51 C is Z=3° C. In this case, the motor of the fan is controlled at 30% of the maximum admissible PWM.

Therefore, the motor of the fan (13) is controlled in PWM, linearly, between a minimum and a maximum value, preventing the fan from revolving uselessly with a maximum number of revolutions. The minimum is for Z=1° C., that is to say 10% of the maximum admissible PWM and the maximum is for Z=10° C., that is to say 100% of the maximum admissible PWM.

Evidently the fan is not switched on until T1>Ttarget.

The cooling system (100) of the invention has the following advantages:

it reduces the warm-up time of the motor in cold starts. Only the block motor (10), and not all the coolant contained in the cooling circuit (14), need to be heated. In an experimental test a motor provided with a cooling system according to the invention has reached the target temperature of 51° C. in only 2 revolutions in the circuit; instead, after 7 revolutions in the same circuit, the same motor with a cooling system provided with a standard mechanical pump was still below the target temperature by 2° C.

it increases the power available for the vehicle because the energy of the motor of the pump is supplied by the battery of the vehicle and is not directly taken from the endothermic motor.

it reduces gasoline consumption because the pump revolves on demand, according to the thermal load of the motor, with lower pollution.

it is versatile because the cooling system can be applied as retrofit to any vehicle, with a few, simple modifications.

it simplifies the cooling circuit because the bypass valve (thermostat) is no longer necessary since the pump itself acts as thermostat.

it manages the electrical motor of the fan of the radiator with variable rpm according to the cooling requirements.

it keeps a more precise operating temperature for the best combustion of the air/gasoline mix.

it manages the cool down of the motor cooling regardless of the fact that the motor is off.

it reduces the wear of the mechanical parts and of the seals of the motor because of a reduction of the warm-up time and of the management of cool-down.

Numerous variations and modifications can be made to the present embodiment of the invention, which are within the reach of an expert of the field, falling in any case within the scope of the invention.

The invention claimed is:

1. A cooling system comprising:
   a motor block;
   a radiator having a fan;
   a cooling circuit adapted to allow a coolant to flow therein, said cooling circuit having a first conduit that extends from said motor block to said radiator and a second conduit that extends from said radiator to said motor block;
   a pump disposed in the second conduit of said cooling circuit and adapted to pump the coolant in said cooling circuit towards said motor block;
   an electrical motor drivingly connected said pump;
   a first temperature sensor disposed in the first conduit of said cooling circuit at the outlet of said motor block, said first temperature sensor adapted to detect a temperature of the coolant at the outlet of said motor block;
   a second temperature sensor disposed in the second conduit of said cooling circuit at an outlet of said radiator and adapted to detect a temperature of the coolant at the outlet of said radiator; and
   a control unit connected to said first temperature sensor and to said second temperature sensor and to said electrical motor, said control unit adapted to actuate said electrical motor and to drive said pump according to temperature values detected by said first temperature sensor and said second temperature sensor, wherein said control unit has a memory in which a reference temperature difference values that decrease gradually are stored in such manner to define a plurality of intervals of decreasing temperature differences, said control unit being configured to compare a temperature difference detected by the temperature sensors with the plurality intervals of decreasing temperature differences stored in the memory and to control said electric motor and said pump according to different modes, wherein the memory of said control unit stores a target temperature set by a user for a correct operation of the motor and a warm-up temperature calculated as a percentage of the target temperature and a threshold temperature calculated as percentage of the target temperature that is between the warm-up temperature and the target temperature and a maximum temperature that is higher than the target temperature so as to form the plurality of intervals, wherein said control unit is configured to compare the temperature detected by said first temperature sensor with the plurality of intervals stored in the memory and control said electric motor and said pump according to the different modes.

2. The system of claim 1, wherein said control unit is configured to actuate the electrical motor and the pump by pulse width modulation by modulating a pulse width according to the reference temperature difference values detected by said first temperature sensor and said second temperature sensor.

3. The cooling system of claim 1, wherein said fan of said radiator has an electrical motor and said control unit is connected to the electrical motor of said fan to actuate the electrical motor of the fan by pulse width modulation according to the temperature detected by said first temperature sensor.

4. A cooling process for a motor made with the cooling system of claim 1, comprising:

storing the reference temperature difference values that define intervals of decreasing temperature differences;

detecting the temperature difference between the temperature (T1) of the coolant coming out from said motor block, the detection being by said first temperature sensor and the temperature of the coolant coming out from said radiator, the detecting being by said second temperature sensor;

comparing the temperature difference detected by said first temperature sensor and said second temperature sensor with the intervals of temperature differences; and controlling the electrical motor and the pump in different modes according to the comparison.

5. The cooling process of claim 4, further comprising:

storing the reference temperature values of the target temperature set by the user for a correct operation of the motor, a warm-up temperature calculated as a percentage of the target temperature, a threshold temperature calculated as percentage of the target temperature and between the warm-up temperature and the target temperature, and a maximum temperature higher than the target temperature so as to form the temperature intervals;

comparing the temperature (T1) detected by said first temperature sensor with said stored temperature intervals; and controlling the electrical motor and the pump with the different modes according to the comparison.

6. The cooling process of claim 5, wherein when the temperature difference that is detected is higher than the reference temperature difference:

a) if the temperature detected by the first temperature sensor is lower than the target temperature, the motor and pump are controlled by pulse width modulation with a constant period and a maximum OFF time;

b) if the temperature detected by said first temperature sensor is between the target temperature and the maximum temperature, the motor and the pump is controlled by pulse width modulation with a linearly decreasing OFF time from the maximum OFF time to a minimum OFF time according to an increase of the temperature detected by said first temperature sensor;

c) if the temperature detected by said first temperature sensor is lower than the target temperature, the motor and the pump are controlled by pulse width modulation with constant period and the maximum OFF time.

7. The cooling process of claim 5, wherein; when the temperature difference that is detected is higher than the reference temperature difference:

a) if the temperature detected by said first temperature sensor is lower than the warm-up temperature, the motor and the pump are controlled by means of pulse width modulation with a linearly decreasing OFF time from a maximum OFF time to a minimum OFF time according to an increase of the temperature; and b) if the temperature detected by said first temperature sensor is higher than the warm-up temperature, the motor and the pump are controlled by pulse width modulation having a duty cycle that increases according to an increase of the temperature sensed by said first temperature sensor according to a Proportional, Integrative, Derivative (PID) algorithm in which a proportional constant, an integrative constant and a derivative constant are calculated.

8. The process of claim 7, wherein the PID algorithm is set such that the proportional constant prevails if the temperature detected by said first temperature sensor is between the warm-up temperature and the threshold temperature, and the integrative constant prevails if the temperature detected by said first temperature sensor is between the threshold temperature and the target temperature, and wherein the pulse width modulation has a maximum admissible value if the temperature detected by said first temperature sensor is higher than the target temperature.

* * * * *